US012460086B2

United States Patent
Banyasz et al.

(10) Patent No.: US 12,460,086 B2
(45) Date of Patent: Nov. 4, 2025

(54) INITIATOR MOLECULE FOR A NON LINEAR ABSORPTION REACTION, PHOTOPOLYMERISABLE COMPOSITION THAT CAN BE ACTIVATED BY BIPHOTONIC ABSORPTION AND ASSOCIATED 3D PRINTING METHOD

(71) Applicants: UNIVERSITE CLAUDE BERNARD LYON 1, Villeurbanne (FR); CENTRE NATIONAL DE LA RECHERCHE SCIENTIFIQUE, Paris (FR); ECOLE NORMALE SUPERIEURE DE LYON, Lyons (FR)

(72) Inventors: Akos Banyasz, Lyons (FR); Cyrille Monnereau, Maubec (FR); Patrice Baldeck, Vizille (FR); Caroline Arnoux, Lyons (FR)

(73) Assignees: UNIVERSITE CLAUDE BERNARD LYON 1, Villeurbanne (FR); CENTRE NATIONAL DE LA RECHERCHE SCIENTIFIQUE, Paris (FR); ECOLE NORMALE SUPERIEURE DE LYON, Lyons (FR)

( * ) Notice: Subject to any disclaimer, the term of this patent is extended or adjusted under 35 U.S.C. 154(b) by 182 days.

(21) Appl. No.: 18/004,649

(22) PCT Filed: Jul. 8, 2021

(86) PCT No.: PCT/EP2021/069034
§ 371 (c)(1),
(2) Date: Jan. 6, 2023

(87) PCT Pub. No.: WO2022/008673
PCT Pub. Date: Jan. 13, 2022

(65) Prior Publication Data
US 2023/0250296 A1 Aug. 10, 2023

(30) Foreign Application Priority Data

Jul. 9, 2020 (FR) ...................................... 2007303

(51) Int. Cl.
*C09D 4/00* (2006.01)
*B29C 64/135* (2017.01)
(Continued)

(52) U.S. Cl.
CPC .............. *C09D 4/00* (2013.01); *B29C 64/135* (2017.08); *B33Y 10/00* (2014.12); *B33Y 70/00* (2014.12);
(Continued)

(58) Field of Classification Search
CPC .......... C09D 4/00; C09D 7/63; C09D 135/02; B29C 64/135; B33Y 10/00; B33Y 70/00
See application file for complete search history.

(56) References Cited

U.S. PATENT DOCUMENTS

2021/0087301 A1    3/2021   Gallais-During et al.
2021/0189156 A1*   6/2021   Baldeck .............. G03F 7/70416

FOREIGN PATENT DOCUMENTS

WO    2019/025717 A1    2/2019
WO    2019/186070 A1   10/2019

OTHER PUBLICATIONS

Arnoux et al. "Polymerization Photoinitiators with Near-Resonance Enhanced Two-Photon Absorption Cross-Section: Towards High-Resolution Photoresists with Improved Sensitivity" Jul. 17, 2020 (Jul. 17, 2020). pp. 1-29.
(Continued)

*Primary Examiner* — Stella K Yi
(74) *Attorney, Agent, or Firm* — TraskBritt (57) ABSTRACT

A polymerization initiator molecule, excitable by two photons and capable of generating polymerization-initiating free
(Continued)

radicals, includes two branches grafted onto a central phenyl nucleus. Each branch includes an oligomer of oligophenyleneethynylenyl type or oligo-2,5-dihalogenphenyleneethynylenyl type. A photopolymerizable composition, activatable by two-photon absorption, includes a radically polymerizable resin and a photochemically effective amount of a radical photoinitiator system. The photoinitiator system includes at least one initiator molecule as described above. Moreover, a method and an associated device for two-photon three-dimensional printing are disclosed. The method includes transforming a volume of a photopolymerizable composition including at least one initiator molecule. The transformation includes irradiating the volume of composition with an irradiation light source emitting an irradiation signal having a wavelength $L_{irr}$ of between 1 and 1.5 times, and preferably between 1.1 and 1.25 times, a cut-off wavelength $L_{CutOff}$ of the initiator molecule. Embodiments may apply to submicron-resolution two-photon 3D printing.

18 Claims, 4 Drawing Sheets

(51) Int. Cl.
　　*B29K 33/00*　　(2006.01)
　　*B33Y 10/00*　　(2015.01)
　　*B33Y 70/00*　　(2020.01)
　　*C08F 2/50*　　(2006.01)
　　*C08F 222/10*　　(2006.01)
　　*C09D 7/63*　　(2018.01)
　　*C09D 135/02*　　(2006.01)

(52) U.S. Cl.
　　CPC .......... *C08F 2/50* (2013.01); *C08F 222/1006* (2013.01); *C08F 222/103* (2020.02); *C09D 7/63* (2018.01); *C09D 135/02* (2013.01); *B29K 2033/08* (2013.01); *B29K 2033/12* (2013.01); *C08F 2800/20* (2013.01)

(56) References Cited

OTHER PUBLICATIONS

Hahn et al. "Rapid assembly of small materials building blocks (Voxels) into large functional 3D metamaterials." Progress Report. Advanced Functional Materials (2019) First published: Jan. 22, 2020.
International Search Report for International Application No. PCT/EP2021/069034, mailed Oct. 15, 2021, 7 pages with English translation.
International Written Opinion for International Application No. PCT/EP2021/069034, mailed Oct. 15, 2021, 8 pages with English machine translation.
Lano et al. "Two photon photosensitizers for PDT: molecular engineering towards understanding of their excited state photophysics" Proceedings of SPIE, US, vol. 8545, Nov. 8, 2012 (Abstract Only).
Mettra et al. "A combined theoretical and experimental investigation on the influence of the bromine substitution pattern on the photophysics of conjugated organic chromophores" Physical Chemistry Chemical Physics, vol. 20, No. 5, pp. 3768-3783, Jan. 1, 2018 (Abstract Only).
Singh et al. "Measurements of third-order optical nonlinearity using Z-scan technique: A review" AIP Conference Proceedings_ vol. 2142, published online: Aug. 29, 2019 (Abstract Only) https://doi.org/10.1063/1.5122548.
B. Mettra et al. "A combined theoretical and experimental investigation on the influence of the bromine substitution pattern on the photophysics of conjugated organic chromophores" Physical Chemistry Chemical Physics, vol. 20, No. 5, pp. 3768-3783, Jan. 1, 2018.
Lanoë et al, "Influence of Bromine Substitution Pattern on the Singlet Oxygen Generation Efficiency of Two-Photon Absorbing Chromophores," Org. Biomol. Chem., vol. 10, No. 31, (2012), pp. 6275-6278.
Lanoe et al. "Two photon photosensitizers for PDT: molecular engineering towards understanding of their excited state photophysics" Proceedings of SPIE, US, vol. 8545, Nov. 8, 2012.
Singh et al. "Measurements of third-order optical nonlinearity using Z-scan technique: A review" AIP Conference Proceedings_ vol. 2142, published online: Aug. 29, 2019 https://doi.org/10.1063/1.5122548.

\* cited by examiner

BDEBP

Fig. 1a

ITX

Fig. 1b

OXE2

INITIATOR MOLECULE FOR A NON LINEAR ABSORPTION REACTION, PHOTOPOLYMERISABLE COMPOSITION THAT CAN BE ACTIVATED BY BIPHOTONIC ABSORPTION AND ASSOCIATED 3D PRINTING METHOD

CROSS-REFERENCE TO RELATED APPLICATIONS

This application is a national phase entry under 35 U.S.C. § 371 of International Patent Application PCT/EP2021/069034, filed Jul. 8, 2021, designating the United States of America and published as International Patent Publication WO 2022/008673 A1 on Jan. 13, 2022, which claims the benefit under Article 8 of the Patent Cooperation Treaty to French Patent Application Serial No. 2007303, filed Jul. 9, 2020.

TECHNICAL FIELD

The disclosure relates to a photopolymerizable composition activatable by nanometric resolution two-photon absorption, and to an associated 3D printing method.

BACKGROUND

Two-photon 3D printing enables the writing of very high resolution structures (resolution of less than 100 nm) but at the cost of an extremely significant writing time. An analysis of the prior art is detailed at more length in document D1=WO2019/025717.

It is possible to accelerate the printing process either i/by parallelization, by separating the incident beam into a multitude of secondary beams (up to several millions of beams), and thus just as many voxels (manufacturing unit, 3D equivalent of a pixel) written simultaneously, or ii/by reducing the exposure time for each voxel, and thus increasing the scanning speed. These strategies (cf, for example, Hahn, Vincent, Pascal Kiefer, Tobias Frenzel, Jingyuan Qu, Eva Blasco, Christopher Barner-Kowollik, and Martin Wegener. "Rapid assembly of small materials building blocks (Voxels) into large functional 3D metamaterials." Advanced Functional Materials (2019): 1907795) require the development of resins that are much more sensitive to two-photon absorption while retaining their capacity for submicron resolution.

Document D2=B. Mettra, Y. Y. Liao, T. Gallavardin, C. Armagnat, D. Pitrat, P. Baldeck, T. Le Bahers, C. Monnereau and C. Andraud, "A combined theoretical and experimental investigation on the influence of the bromine substitution pattern on the photophysics of conjugated organic chromophores," Phys. Chem. Chem. Phys., 2018, 20, 3768, describes molecules having a certain sensitivity to two-photon absorption, notably molecules obtained by substitution of an atom or a plurality of heavy atoms on a central phenyl nucleus by a branch comprising an oligomer.

BRIEF SUMMARY

Embodiments of the present disclosure aim to overcome at least one of the disadvantages of the known initiator molecules, compositions and two-photon 3D printing methods.

To this end, the disclosure describes a novel polymerization initiator molecule, capable of being excited by two photons and of generating polymerization-initiating free radicals, the molecule being characterized in that it comprises two branches grafted onto a central phenyl nucleus at positions 1 and 3, each branch comprising an oligomer of oligophenyleneethynylenyl type or oligo-2,5-dihalogenphenyleneethynylenyl type.

Compared to initiator molecules conventionally used in the context of photolithography by two-photon absorption in the visible domain and, more particularly, 532 nm, for example, known molecules having small-dimension pi-conjugated structures, the initiator molecules according to embodiments of the disclosure have larger branches that are better suited to obtaining high non-linearities, which lead to much greater effective cross sections for two-photon absorption (TPA), as will be better seen in what follows. Thus, the initiator molecules according to embodiments of the disclosure are characterized by a very high TPA sensitivity. In addition, the number and the dimensions of the branches of the initiator molecules contribute to reducing their mobility in the photopolymerizable composition, which improves the 3D printing resolution.

In addition, compared to the molecules described in D2, and notably compared to the linear molecules shown in FIG. 1 of D2 and having branches of identical or near-identical length, the molecule according to embodiments of the disclosure comprising branches grafted onto a central phenyl nucleus at positions 1 and 3 has absorption and emission spectra that are shifted far less into the red or infrared, while preserving nonlinear optical properties, inter alia a high effective cross section for two-photon absorption. The molecule according to embodiments of the disclosure has in that an ideal compromise between high non-linearity and transparency in the visible, making it possible to have significant two-photon absorption in the visible without residual single-photon absorption, which is not the case with linear molecules of comparable conjugation length. Two-photon absorption in the visible makes it possible to use lasers that are easier to implement. For instance, tests with a 532 nm laser have yielded particularly interesting results, as will be better seen further below.

According to one embodiment, each branch comprises an oligomer of oligo-2,5-dihalogenphenyleneethynylenyl type.

The halogen substituents preferably correspond to two bromine atoms. This halogen is known for amplifying intersystem crossing processes when it is incorporated within pi-conjugated structures by the heavy atom effect, bringing the molecule to a triplet-type excited state. The triplet state, with a longer lifetime, is therefore more suitable for producing the photochemical reactions (typically photoinduced electron transfer) that are the origin of the generation of radicals. Compared to the halogens that precede it in the periodic table (F, Cl), bromine generates a far more marked heavy atom effect while possessing a lower sensitivity than that of iodine to chemical side reactions, enabling easier functionalization of the target molecule.

Also according to an embodiment, the free end of each branch of an initiator molecule in accordance with embodiments of the disclosure is terminated by a terminal phenylamine, preferably by a terminal phenylamine of dialkylphenylamine type, and more preferentially still a dihexylphenylamine. The alkyl groups substituted onto the terminal functions of the phenylamine render the initiator molecule according to embodiments of the disclosure soluble in the composition. This makes it possible to avoid the addition of organic solvent during the formulation of the resin, a process which is generally tedious, costly and potentially toxic. In addition, the alkyl groups limit crystallization of the initiator molecule, which is favorable for use in 3D printing, where the presence of crystals is problematic.

According to an embodiment, an initiator molecule in accordance with embodiments of the disclosure comprises a halogen atom and two branches grafted onto the central phenyl nucleus respectively at positions 1, 3 and 5. The initiator molecule comprising two branches has good sensitivity and at the same time good solubility in the photopolymerizable composition, which enables a good overall reactivity of the composition. The halogen atom is preferably a bromine atom, for its advantages explained above.

According to another embodiment, the initiator molecule is associated with a co-initiator molecule, such as an amine-derived molecule or an iodonium-derived molecule, as will be better seen further below.

The disclosure also proposes a photopolymerizable composition according to embodiments of the disclosure, comprising:
a radically polymerizable resin and
a photochemically effective amount of a radical photoinitiator system,
the composition being characterized in that the photoinitiator system comprises at least one initiator molecule as described above.

The term "photochemically effective amount" is understood to mean an "amount sufficient to make it possible to polymerize the resin." The amount depends on the photoinitiator system, notably on its reactivity and its solubility in the composition. For a composition comprising a particular photoinitiator system and resin, a measurement of the polymerization threshold and the characteristics of the structures makes it possible to determine a minimum value and a maximum value for a "photochemically effective amount" of the photoinitiator system; the amount, or the range of values of the amount, may, for example, be expressed as a percentage of a total amount of composition equal to 100%.

The polymerizable resin comprises a main monomer of vinyl monomer type, preferably an acrylate monomer or methacrylate monomer. The main monomer is chosen so as to be highly crosslinkable in order to obtain a submicron and preferably nanometric resolution.

Preferably, the main monomer is a multifunctional acrylate monomer, for example, a dipentaerythritol penta/hexaacrylate (DPPHA) or a pentaerythritol triacrylate (PETA). The multifunctionality of the monomer makes it possible to have significant and rapid crosslinking which imparts the resin with sensitivity, solidity and resolution.

The polymerizable resin may also comprise a solubilizing component, such as:
a monoacrylate with at least one alkyl chain, for example a hexyl acrylate,
a diacrylate with at least one alkyl chain, for example a poly(ethylene glycol) diacrylate (PEGDA), or a 1,10-decanediol diacrylate (DDA), or
a dithiol, for example a 1,10-decanedithiol (DDT).

Besides its solubilizing properties provided by one or more alkyl chains, diacrylates or dithiols are also advantageous for their moderate crosslinking properties, which aid in terminating the polymerization of the resin once the polymerization reaction is initiated by the main monomer; the final degree of polymerization of the composition is thus improved.

The composition may comprise from 0.1% to 10%, preferably 0.2% to 5% and more preferentially still 0.5% to 1.5% by weight of photoinitiator system. These amounts are a compromise between the amount of photoinitiator that it is possible to dissolve directly in the resin and the overall reactivity of the composition. The latter tends to increase with increasing concentrations of photoinitiator, but the benefit is reduced beyond 2% by mass.

The composition may comprise 5% to 60%, and preferably 10% to 25% of solubilizing component. These amounts are once again a compromise between the amount of photoinitiator that the solubilizing component makes it possible to dissolve in the resin, and the overall reactivity of the composition.

The disclosure also relates to a method for three-dimensional printing, comprising a step of transformation of a volume of a photopolymerizable composition that is activatable by two-photon absorption, the composition comprising a radically polymerizable resin and a photochemically effective amount of a photoinitiator system, the photoinitiator system comprising at least one initiator molecule capable of being excited by two photons and of generating polymerization-initiating free radicals, the transformation step consisting in irradiating the volume of composition with an irradiation source emitting an irradiation signal having a wavelength $L_{irr}$ of between 1 and 1.5 times, and preferably between 1.1 and 1.25 times, a cut-off wavelength $L_{CutOff}$ of the initiator molecule, $L_{CutOff}$ being defined as the wavelength beyond which the molar extinction coefficient of the photoinitiator is considered negligible as it is less than 1% of the maximum value of the molar extinction coefficient of the initiator molecule.

Experience has shown that the choice of an irradiation signal of which the wavelength $L_{irr}$, while remaining one-photon non-resonant, is close to $(1*L_{CutOff} < L_{irr} < 1.5*L_{CutOff})$ of the range of single-photon absorption $(L<L_{CutOff})$ of the initiator molecules of the photoinitiator system makes it possible to greatly reduce the irradiance (amount of energy per unit of time and irradiated surface area, in W·cm-2) that is required to induce, by two-photon absorption, the generation of free radicals, as will be better seen further below.

Preferably, the wavelength of the irradiation signal is between 1.1 and 1.25 times the cut-off wavelength $L_{CutOff}$. This makes it possible to eliminate the risk of residual single-photon absorption while ensuring the most efficient possible reaction with the lowest possible irradiance.

According to one embodiment of the method, the photopolymerizable composition is a composition according to embodiments of the disclosure as described above.

Preferably, the irradiation signal results from a laser with a wavelength of between 508 and 578 nm, for example $L_{irr}$=532 nm. Irradiation close to the polymerization threshold makes it possible to obtain nanometric line widths and heights typically of 100 nm and 200 nm. Under these conditions, the printing method according to embodiments of the disclosure enables spatial nanostructures with periods of 250 nm in the horizontal plane and 350 nm in the vertical plane, as will be better seen further below in the examples.

The step of three-dimensional irradiation of the volume of composition may be carried out by a technique of direct writing by a laser-type irradiation source, the technique being performed at a high speed, preferably at a speed of greater than 50 mm/s, and more preferentially still at a speed of greater than 1 m/s. According to a variant, the step of three-dimensional irradiation of the volume of composition may be carried out by a technique of parallel projection, of photolithographic type or of holographic projection type, with a large number of irradiation sources, preferably with a number of irradiation sources of greater than ten thousand, and more preferentially still greater than one million. According to yet another variant, the step of three-dimensional irradiation of the volume of composition may be carried out by a technique of direct writing with a single beam or by a technique of parallel projection with a plurality of beams.

Lastly, the disclosure also relates to a three-dimensional printing device comprising means arranged to implement the method according to embodiments of the disclosure and as described above.

BRIEF DESCRIPTION OF THE DRAWINGS

Other features and advantages of embodiments of the disclosure will become apparent on reading the detailed description of exemplary embodiments of the disclosure, given solely by way of example, and with reference to the accompanying drawings, in which:

FIG. 1 (i.e., FIG. 1a, FIG. 1b, and FIG. 1c) shows examples of known initiator molecules.

DETAILED DESCRIPTION

As stated above, the disclosure relates to a photopolymerizable composition activatable by two-photon absorption, the composition comprising:
 a radically polymerizable resin and
 a photochemically effective amount of a radical photoinitiator system, capable of being excited by multiple photons and of generating free radicals.

The composition according to embodiments of the disclosure is characterized in that the photoinitiator system comprises at least one initiator molecule comprising two branches grafted onto a central phenyl nucleus at positions 1 and 3, each branch comprising an oligomer of oligophenyleneethynylenyl type or oligo-2,5-dihalogenphenyleneethynylenyl type.

Figure 2:
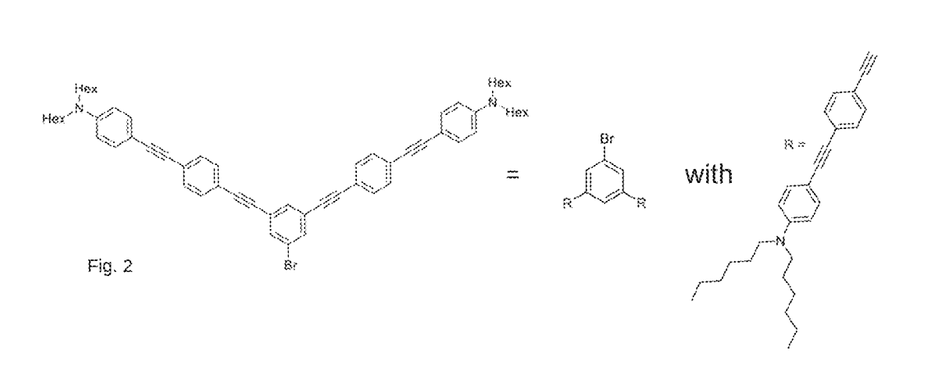
FIG. 2 shows a first example of initiator molecules according to embodiments of the disclosure.

FIG. 2 shows an example of an initiator molecule with two branches, according to embodiments of the disclosure, which will be referred to hereinafter for simplification as PA2.

Figure 3:
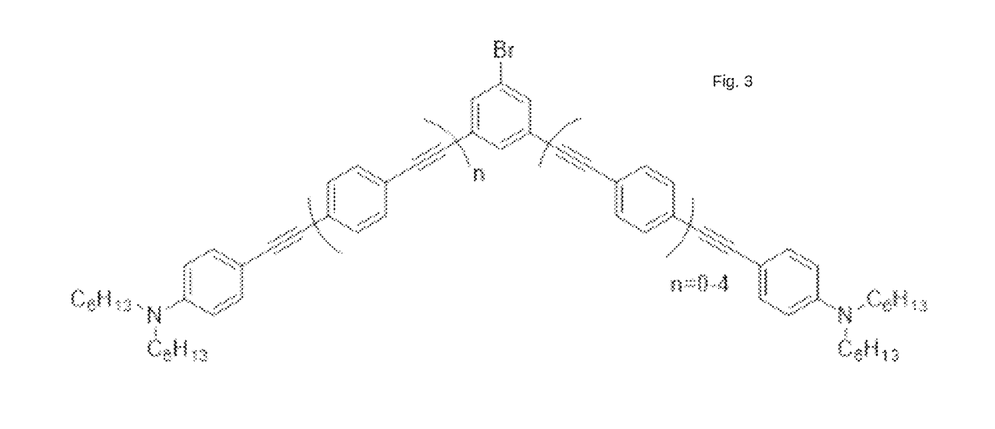
FIG. 3 shows a variant of FIG. 2, according to embodiments of the disclosure.
Figure 4:
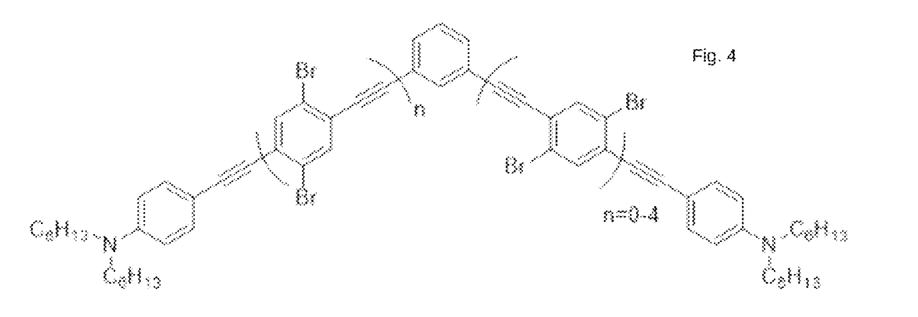
FIG. 4 shows a variant of FIG. 2, according to embodiments of the disclosure.
Figure 5:
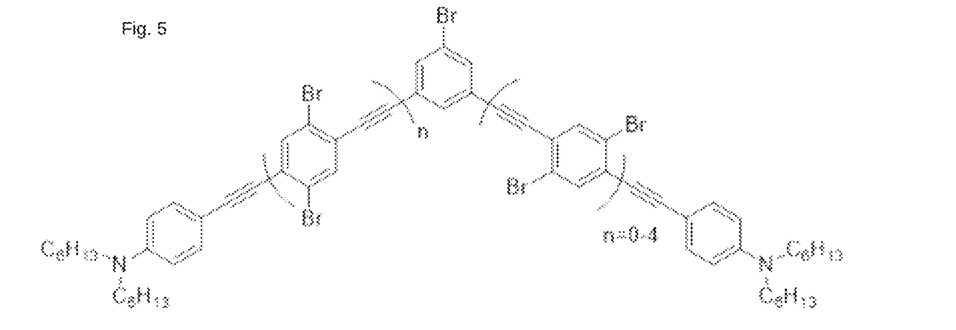
FIG. 5 shows a variant of FIG. 2, according to embodiments of the disclosure.

FIGS. 3 to 5 show variants of the molecule of FIG. 2.

Figure 6:
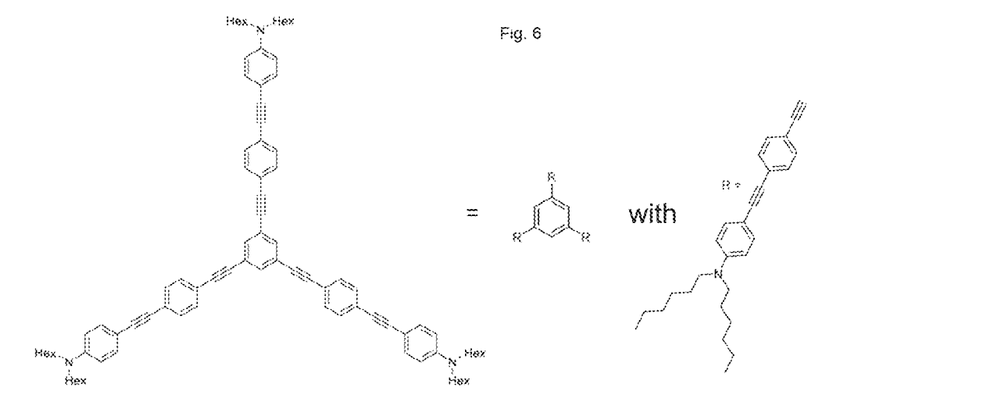
FIG. 6 shows an example of initiator molecules similar to the example of FIG. 2.

FIG. 6 shows an example of an initiator molecule with three branches (which will be referred to hereinafter as PA3), similar to that of FIG. 2.

In these examples, each branch of a molecule according to embodiments of the disclosure comprises (or starts with) a phenyleneethynylenyl such as:

a phenyleneethynylenyl (FIG. 2), and more generally an oligo-2,5-phenyleneethynylenyl (FIG. 3 with n between 0 and 4)
 an oligo-2,5-dibromophenyleneethynylenyl (FIGS. 4 and 5 with n between 0 and 4), and more generally, an oligo-2,5-dihalogenphenyleneethynylenyl with n between 0 and 4, and two halogens per phenyleneethynylenyl group, the halogens being, for example, bromine, chlorine, iodine, fluorine or astatine.

The elongation of the phenyleneethynylenyl structure facilitates the achievement of non-linear absorption, but is detrimental to the dissolution of the initiator molecules in the composition. Thus, experience has shown that, beyond n=4, the dissolution of the molecules is no longer sufficient for the overall reactivity of the composition to be advantageous.

The presence of halogens makes it possible to increase the spin-orbit coupling within the molecule and optimize the photoinduced formation firstly of the photoinitiator in its triplet state and secondly of radicals (consecutively to a photoinduced transfer of electrons); the initiator molecules with halogens are therefore more efficient than similar molecules without halogens. In particular, the best results have been obtained with bromine: specifically, tests with bromine have shown that the photopolymerization threshold could be reduced, compared to their unsubstituted analogues, by a factor of 1.5 to 2.

However, the presence of halogens limits the solubility of the molecule in the resin of interest. A compromise must therefore be made between the efficiency of the initiator molecule and the presence (number) of halogens.

According to one embodiment of the disclosure, the free end of each branch of the initiator molecule is terminated by a terminal phenylamine (aniline), preferably a terminal phenylamine of dialkylaminophenyl type; in the examples of molecules in FIG. 2 (molecule PA2) and FIGS. 3 to 5, the phenylamine end group is a terminal dihexylaminophenylethynyl group. The presence of these carbon-based fatty chains (two alkyl groups) enables the direct dissolution of the initiator molecules. During the tests, hexyl groups (cf. the examples shown with two hexyl groups) gave the best results.

The branches of the initiator molecules according to embodiments of the disclosure are thus of the type:
 R=-[p-N,N-(dialkyl)aminophenylethynyl](oligophenylene-ethynylenyl) or
 R'=-[p-N,N-(dialkyl)aminophenylethynyl](oligo-2,5-dihalogenphenyleneethynylenyl).

The initiator molecules of FIGS. 2, 3 and 5 have two branches and comprise two branches of R type and a halogen atom (bromine here) that are grafted onto the central phenyl nucleus, respectively at positions 1, 3 and 5. They may be synthesized, for example, by the substitution, by branches of R type, of two halogen atoms present on a phenyl nucleus comprising three halogen atoms at positions 1, 3 and 5.

The initiator molecule of FIG. 4 has two branches of R' type grafted onto the central phenyl nucleus, respectively at positions 1 and 3, position 5 being occupied by a hydrogen. It may be synthesized, for example, by the substitution, by branches of R' type, of two hydrogen atoms present on a phenyl nucleus comprising three hydrogen atoms at positions 1, 3 and 5.

The initiator molecule PA3 of FIG. 6, for its part, has three branches of R type grafted onto the central phenyl nucleus, respectively at positions 1, 3 and 5. It may be synthesized, for example, by the substitution, by branches of R type, of three hydrogen atoms present on a phenyl nucleus at positions 1, 3 and 5.

Figure 1A:
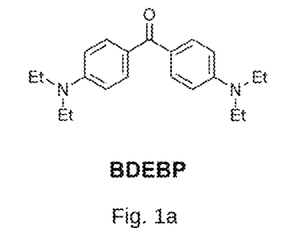
Figure 1B:
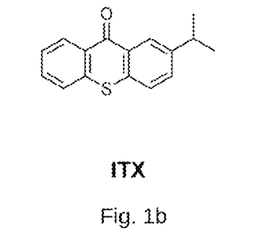
Figure 1C:
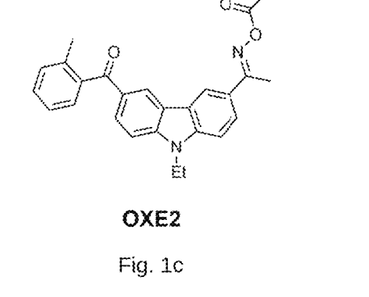

Tests have been carried out on the initiator molecules according to embodiments of the disclosure and compositions incorporating initiator molecules according to embodiments of the disclosure and, more particularly, on the molecule PA2 of FIG. 2. Similar tests have also been carried out on a similar initiator molecule, molecule PA3, and also on known molecules marketed and commonly used in photosensitive compositions, in the present case the molecules:

Molecule 4,4'-bis(N,N-diethylamino)benzophenone of NORRISH type II, represented in FIG. 1a, which will be referred to hereinafter as BDEBP, Molecule 2-isopropylthioxanthone, of NORRISH type II, represented in FIG. 1b, which will be referred to hereinafter as ITX, Molecule [1-[9-ethyl-6-(2-methylbenzoyl)carbazol-3-yl]ethylideneamino] acetate, of NORRISH type I, represented in FIG. 1c, which will be referred to hereinafter as OXE2.

The tests, and the comparisons thereof, made it possible to demonstrate the following points.

Figure 7:
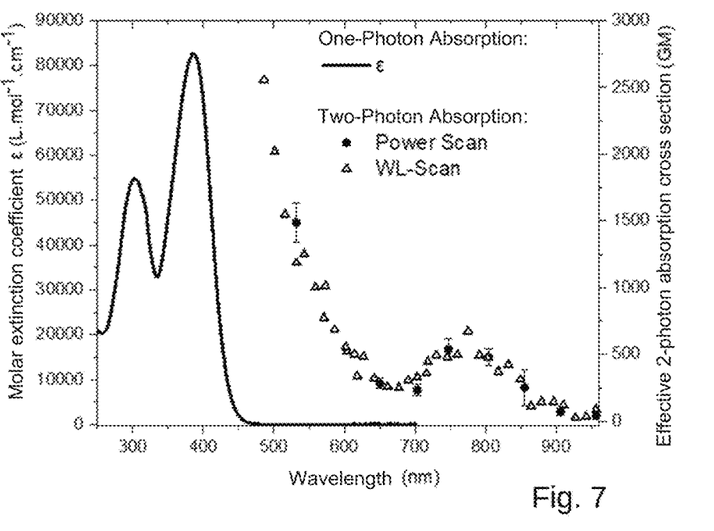
FIG. 7 shows the variation in the one-photon absorption (OPA) and two-photon absorption of the molecule of FIG. 2, as a function of the wavelength of an excitation signal, FIG. 8 (i.e., FIG. 8a, FIG. 8b, FIG. 8c, and FIG. 8d) shows results of implementing the method according to embodiments of the disclosure, FIG. 9 (i.e., FIG. 9a, FIG. 9b, FIG. 9c, and FIG. 9d) shows other results of implementing the method according to embodiments of the disclosure.

The absorption spectrum of the molecule PA2 was measured according to conventional techniques, for a sample of molecules dissolved in dichloromethane. FIG. 7 shows the molar extinction coefficient of the molecule PA2. The molar extinction coefficient is an intrinsic parameter of a molecule, directly proportional to the absorbance of a composition containing the molecule; more precisely, the absorbance of the molecule is obtained by multiplying the molar extinction coefficient by the concentration of the molecule in the composition used for performing the measurement and by the length of the cuvette containing the composition used for the measurement. For the molecule PA2, the following is noted:

an absorption peak (or a single-photon absorption resonance) at the wavelength $L_{absR}=386$ nm, a photon absorption cut-off wavelength $L_{CutOff}=462$ nm, the wavelength starting from which the single-photon absorption can be considered to be negligible, since the molar extinction coefficient of the molecule is less than 1% of the maximum value of the molar extinction coefficient (absorption peak) over the absorption band, the absorption band corresponding to the range of wavelengths of signals that the molecule can absorb.

By comparison, the measurement of the absorption spectrum of PA3 dissolved in dichloromethane reveals results similar to those obtained for the molecule PA2, and the single-photon absorption resonance wavelength measured under the same conditions for the molecules BDEBP, ITX and OXE2 is equal, respectively, to $L_{absR}=362$ nm, $L_{absR}=386$ nm and $L_{absR}=340$ nm.

Two-photon absorption was also studied for the initiator molecule PA2, using a technique known to the person skilled in the art, the "Z-scan" measurement technique, enabling a measurement of the effective two-photon absorption cross sections of the initiator molecules, including non-luminescent molecules, over broad wavelength ranges. This technique is notably described in the publication Measurements of Third-Order Optical Nonlinearity using Z-Scan Technique: A Review, Vijender Singh* et al., AIP Conference Proceedings 2142, 140035 (2019).

To study the molecule PA2, a single measurement was taken at each wavelength at a given power ("WL scan" measurement), which makes it possible to quantify what is absorbed as a function of the wavelength. In addition, a plurality of measurements are taken for a given wavelength while varying the power ("Power scan" measurement) in order to verify that a quadratic law is really being followed and thus that the Z-scan is really measuring two-photon absorption. The measurement is carried out over a wavelength range extending from 490 to 960 nm (FIG. 7 for the molecule PA2, right-hand scale, effective two-photon absorption cross section), i.e. the broadest possible range while avoiding one-photon absorption (hence remaining above $L_{CutOff}=462$ nm-cf. FIG. 7, left-hand scale, the curve corresponding to the molar extinction coefficient F). The analysis thus shows a two-photon absorption peak in the vicinity of L=770 nm, which corresponds to twice the wavelength $L_{absR}=386$ nm of the single-photon absorption resonance. This result is consistent with conventional practice, which consists in using irradiation sources having a wavelength approximately equal to double the one-photon absorption resonance wavelength to instigate two-photon reactions involving an electronic transition to this same excited state. However, the analysis also shows (FIG. 7) that the effective two-photon absorption cross section increases greatly when the wavelength is reduced, and approaches the one-photon absorption limit. For example, for a wavelength L=770 nm, the effective two-photon absorption cross section for a molecule PA2 is of the order of GM (1 GM=10-50 cm4·s photon-1), while for a wavelength of 532 nm, the effective two-photon absorption cross section for a molecule PA2 reaches 1500+/−200 GM. These effective cross sections exceed 2000 GM at 500 nm for the molecule PA2 while remaining strictly two-photon in nature.

By comparison, for the molecule BDEBP, the effective two-photon absorption cross section for a wavelength of 532 nm is of the order of 77+/−11 GM. The sensitivity of the molecule PA2 is thus much greater than that of the molecule BDEBP commonly used today for two-photon absorption reactions, and a fortiori than those of the molecules specifically used at 532 nm (OXE2 type), the estimated values for the effective cross sections of which generally vary between a few GM and a few tens of GM.

These results are all the more advantageous since they make it possible to envisage the irradiation of the molecules with irradiation sources in the visible domain (wavelengths of less than 750 nm), including molecules generally used in the near-infrared (conventionally at a wavelength double that of their single-photon resonance ($L_{absR}$)). Irradiation sources in the visible domain generally offer better resolution than infrared sources and, moreover, as the disclosure shows, they provide greater two-photon absorption efficiency, contrary to the current paradigm, on account of the increase in the effective cross section near to the resonance.

The disclosure also relates to a polymerizable resin composition incorporating an initiator molecule as described above. The composition comprises a main monomer of vinyl monomer type, preferably an acrylate monomer or a methacrylate monomer. These monomers are known for their high reactivity in radical polymerization. Among the compositions tested, monomers of triacrylate type such as pentaerythritol triacrylate (PETA) gave good results and monomers of dipentaerythritol penta/hexaacrylate (DPPHA) type gave the best results in combination with PA2-type initiator molecules.

As has been seen above, the initiator molecules according to embodiments of the disclosure comprise, at the end of their branches, a terminal alkylphenylamine of which one of the functions is to facilitate the dissolution of the molecule in the composition. To further improve this dissolution, a solubilizing comonomer may be added, such as:
- a monoacrylate with at least one alkyl chain, for example a hexyl acrylate,
- a diacrylate with at least one alkyl chain, for example a poly(ethylene glycol) diacrylate (PEGDA), a 1,6-hexanediol diacrylate (HDODA), or a 1,10-decanediol diacrylate (DDA),
- a dithiol, for example a 1,10-decanedithiol (DDT).

Various compositions were produced and tested, with the following components and proportions by weight (wt %):
- 0.1% to 10% by weight (wt %) of a photoinitiator system comprising an initiator molecule,
- 5% to 60% by weight of a diluent component, and
- the remainder to 100% by weight of main monomers.

Among the compositions produced and tested, the most advantageous compositions comprise 0.2% to 5% by weight of photoinitiator system and/or 10% to 25% by weight of solubilizing component. Some examples from among the most notable ones are given below.

Example 1: compositions comprising dipentaerythritol penta/hexaacrylate (DPPHA) and 1,10-decanediol diacrylate (DDA) monomers and the molecule PA2, with various proportions by mass (wt % or % by weight):
- composition 1a. DPPHA/DDA/PA2, proportions by mass: 79.6/19.1/0.5
- composition 1b. DPPHA/DDA/PA2, proportions by mass: 59.7/39.8/0.5
- composition 1c. DPPHA/DDA/PA2, proportions by mass: 89.55/9.95/0.5
- composition 1e. DPPHA/DDA/PA2, proportions by mass: 79.2/19.8/1
- composition 1f DPPHA/DDA/PA2, proportions by mass: 58.9/36.1/5

DDA makes it possible to improve the dissolution of the initiator molecule PA2 in the composition and also makes the composition less viscous, but DDA is less reactive than DPPHA during 3D printing. While all of compositions 1a to 1f give good results, composition 1e gives the best compromise.

Example 2: composition comprising dipentaerythritol penta/hexaacrylate (DPPHA) monomers, 1,10-decanedithiol (DDT) molecules and PA2 molecules, with the following proportions by mass (wt %):
- composition 2. DPPHA/DDT/PA2, proportions by mass: 67.04/32.11/0.85

The use of DDT also gives good results in terms of microfabrication (threshold comparable to similar compositions with DDA instead of DDT), but more DDT needs to be used compared to DDA in order to achieve an equivalent solubility; composition 1e thus remains the best compromise.

Example 3: composition comprising dipentaerythritol penta/hexaacrylate (DPPHA) monomers, poly(ethylene glycol) diacrylate (PEGDA) monomers and PA2 molecules, with the following proportions by mass (wt %):
- composition 3. DPPHA/PEGDA/PA2, proportions by mass: 49.9/49.9/0.2

Example 4: compositions comprising pentaerythritol triacrylate (PETA) and 1,10-decanediol diacrylate (DDA) monomers and the molecule PA2, with various proportions by mass (wt %):
- composition 4a. PETA/DDA/PA2, proportions by mass: 59.7/39.8/0.5
- composition 4b. PETA/DDA/PA2, proportions by mass: 60/37/3
- composition 4c. PETA/DDA/PA2, proportions by mass: 60/35/5

Example 5: composition comprising dipentaerythritol penta/hexaacrylate (DPPHA) monomers, 1,10-decanediol diacrylate (DDA) monomers and PA3 molecules, with the following proportions by mass (wt %):
- composition 5. DPPHA/DDA/PA3 proportions by mass: 79.47/19.87/0.66

Compared with example 1e, it is noted that the molecule PA3 is more difficult to dissolve in the composition, an amount of 20 wt % of DDA allowing only 0.66 wt % of PA3 to be dissolved, whereas it allows at least 1 wt % of PA2 to be dissolved. Despite slightly superior characteristics of the photoinitiator, the compositions with the molecules PA3 are thus less efficient than those containing the molecules PA2 with the same proportions of DPPHA and DDA monomers.

From various tests, and among the most advantageous compositions, the most reactive compositions comprise 0.5% to 1.5% by weight of photoinitiator system and/or 10% to 25% by weight of solubilizing component.

In addition to an initiator molecule as described above, the photoinitiator system may also comprise a co-initiator suitable for improving the formation of radicals. A co-initiator, electron acceptor, of diphenyliodonium type for example, decomposes by generating an aryl radical. Other co-initiators such as amines of aliphatic amine type (generation of the radical by abstraction of hydrogen on the aliphatic carbon in alpha position with respect to the nitrogen) or triarylamines (electron transfer leading to the formation of a cation radical on the lone pair of the nitrogen) may also be envisaged. However, they are not indispensable on account of the alkylphenylamine end groups at the ends of each branch of the initiator molecules according to embodiments of the disclosure, which play the same role.

The disclosure lastly relates to a method for two-photon three-dimensional printing, comprising a step of transformation of a volume of a photopolymerizable composition comprising a radically polymerizable resin and a photochemically effective amount of a photoinitiator system capable of being excited by multiple photons and capable of generating free radicals, the photoinitiator system comprising at least one initiator molecule, the transformation step consisting in irradiating the volume of composition with an irradiation source emitting an irradiation signal having a wavelength $L_{irr}$ of between 1 and 1.5 times, and preferably between 1.1 and 1.25 times, a cut-off wavelength $L_{CutOff}$ of the initiator molecule, beyond which the molar extinction coefficient of the initiator molecule is less than 1% of the maximum value of the molar extinction coefficient of the initiator molecule.

By choosing a wavelength $L_{irr}$ greater than the wavelength $L_{CutOff}$, the risk of a prevalence of one-photon absorption compared to two-photon absorption during the irradiation of the composition is limited. Better still, by choosing a wavelength $L_{irr}$ greater than 1.1 times the wavelength $L_{CutOff}$, the risk of the appearance of a one-photon absorption reaction is even zero, as demonstrated by variable-power Z-scan tests (power scan, FIG. 7).

By choosing a wavelength $L_{irr}$ less than 1.5 times the wavelength $L_{CutOff}$, two-photon excitation is deliberately positioned close to the one-photon absorption resonance wavelength $L_{absR}$ of the initiator molecule, that is to say within the zone in which the sensitivity of the initiator molecule is at least just as great as for a wavelength $L_{irr}$ close to 2 times the one-photon absorption resonance wavelength $L_{absR}$ (FIG. 7), as shown by the analysis of the effective two-photon absorption cross sections. Better still, by choosing a wavelength $L_{irr}$ less than 1.25 times the wavelength $L_{CutOff}$ of the initiator molecule, the reaction is deliberately positioned within the zone in which the sensitivity of the initiator molecule is much greater than for a wavelength $L_{irr}$ close to 2 times the one-photon absorption resonance wavelength $L_{absR}$ (FIG. 7).

According to a preferred embodiment, the initiator molecule is a molecule according to embodiments of the disclosure as described above. It is thus possible to choose an irradiation light source of a wavelength $L_{irr}$=532 nm, of between 508 nm (=1.1*$L_{CutOff}$, with $L_{CutOff}$=462 nm, cf. FIG. 7), and 578 nm (=1.5*$L_{CutOff}$).

In particular, in the example of the molecule PA2, the effective absorption cross section for wavelengths $L_{irr}$ of less than 578 nm (=1.25*$L_{CutOff}$) is greater than around 1000 GM (cf. FIG. 7), i.e. greater than the effective absorption cross section for wavelengths $L_{irr}$ in the vicinity of twice the one-photon absorption resonance wavelength $L_{absR}$ of the initiator molecule (around 650 GM at the wavelength 770 nm-cf. FIG. 7). Better still, the effective absorption cross section for wavelengths $L_{irr}$ of less than 532 nm is greater than around 1500 GM, and increases further when $L_{irr}$ decreases. For the molecule PA3, the results are less advantageous than for PA2; specifically, the effective absorption cross section for a given wavelength is substantially less for PA3 compared to PA2; for example, the effective absorption cross section for PA3 only reaches approximately 740 GM at 532 nm.

Printing tests, that were more than conclusive, were carried out with a laser of wavelength $L_{irr}$=532 nm. More precisely, the laser used for the tests described below is a laser pulsed at a frequency of 11.7 kHz, producing irradiation pulses with a duration of 560 ps (picoseconds). Additional tests showed the applicability of the system to pulsed lasers producing irradiation pulses with durations of the order of nanoseconds (ns) and of femtoseconds (fs), at wavelengths of between 515 and 532 nm, with similar conclusions. More precisely, the additional lasers used have the following characteristics:

wavelength 515 nm, frequency from 1 Hz to 2 MHz, 280 fs pulse wavelength 522 nm, frequency of 63 MHz, 250 fs pulse wavelength 532 nm, frequency of 500 Hz, 400 ps pulse.

In order to determine the efficiency of the molecules and of the compositions according to embodiments of the disclosure, the polymerization threshold (minimum power of the irradiation signal required for the polymerization) and the minimum size of objects that could be produced by the method according to embodiments of the disclosure were notably analyzed. The polymerization threshold is considered to be reached when the structures photogenerated by the irradiation step can tolerate a step of final rinsing of the monomer residues without undergoing significant distortion.

For this analysis, two tests were carried out. A first test (FIGS. 8c and 8d) consists in printing a series of 20 µm lines spaced apart by 4 µm on a substrate; the laser is focused exactly on or very slightly above the substrate, for a precise measurement of the line width while ensuring adhesion of the lines to the substrate. A second test (FIGS. 8a and 8b) consists in printing 13 µm lines suspended between two blocks 5 µm apart, to ensure good mechanical stability of the line; the lines are positioned 1.5 µm above the substrate. This second test makes it possible to determine the height of the lines, a parameter not accessible with the first test.

For both tests, the lines are produced with decreasing irradiation powers, down to the limit of the polymerization threshold, and the printing speed is the same, 40 µm/s.

By comparing the two tests (line on substrate and suspended line), it is found that, for a given resin composition and at a given power, the differences between the line widths are not significant, which shows the reproducibility of the printing method and the robustness of the measurement protocols.

Figures 8A, 8B, 8D:
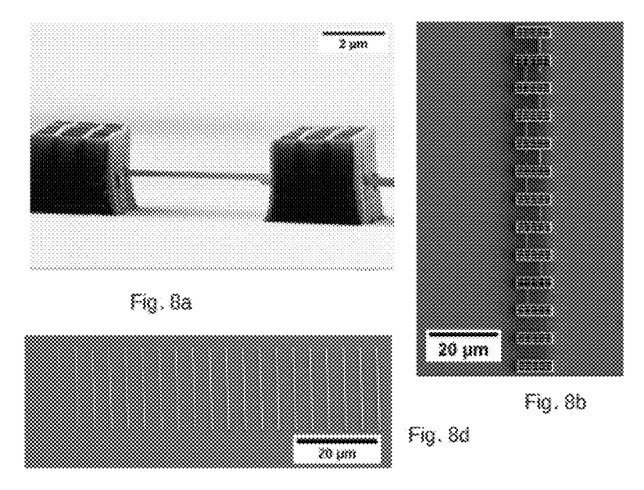
Figure 8C:
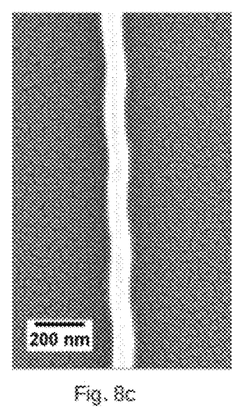

FIGS. 8a to 8d more precisely show, for the composition 1e, DPPHA/DDA/PA2 (79.2%/19.8%/1%):

FIG. 8a: a view of an entire suspended line, obtained from the composition 1e, irradiated by an irradiation signal with a power of 103 µW, FIG. 8b: a view from above of suspended lines, obtained from the composition 1e, irradiated by an irradiation signal with a power decreasing, from top to bottom, from 257 µW to 82 µW, FIG. 8c: a view from above of a line written on a substrate, from the composition 1e, irradiated by an irradiation signal with a power of 85 µW, FIG. 8d: a view from above of a series of lines written on the surface of a substrate from the composition 1e, irradiated by an irradiation signal with a power increasing, from left to right, from 75 µW to 303 µW.

The two tests (lines on substrate and suspended lines) were also carried out for compositions comprising one of the three initiator molecules BDEBP, ITX and OXE2, with compositions comprising:

DPPHA/DDA, in a proportion by mass of 80/20, to which is added 5.4 µmol of an initiator molecule, BDEBP, ITX or OXE2, per gram of composition.

The tests carried out with decreasing powers (FIGS. 8b and 8d for PA2) made it possible to determine the minimum polymerization threshold for each of the compositions based on the 80/20 proportion by mass DPPHA/DDA mixture and the addition of 5.4 µmol of initiator molecule per gram of composition:

PA2: 120 µW
BDEBP: 550 µW
ITX: 690 µW
OXE2: 480 µW

The choice to add 5.4 µmol of initiator molecule to the 80/20 proportion by mass DPPHA/DDA mixture was done so as to dissolve the same amount of initiator molecules PA2, BDEBP, ITX or OXE2 in the mixture. Other tests more specifically with the molecule PA2 showed that it is possible to further lower the threshold to 85 µW, by adding 10.9 µmol of initiator molecule PA2.

The tests thus confirm the substantially lower polymerization thresholds, by a factor of 4 to 6, for the PA2-type initiator molecules with two branches compared to the known initiator molecules (BDEBP, ITX, OXE2). This is essentially explained by the very great improvement in the capacity of the PA2-type molecules with two branches to simultaneously absorb two photons, as shown by the high value for their effective absorption cross section for a wavelength $L_{irr}$=532 nm.

Figure 9A:
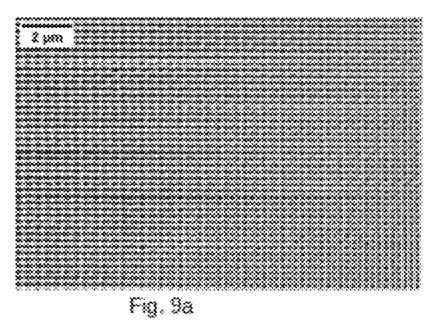
Figure 9B:
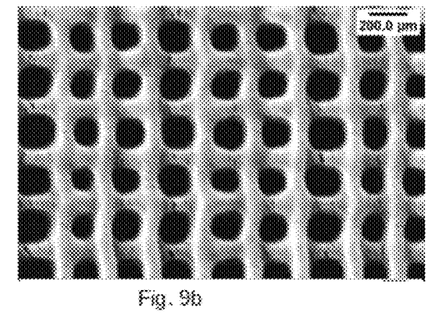
Figure 9C:
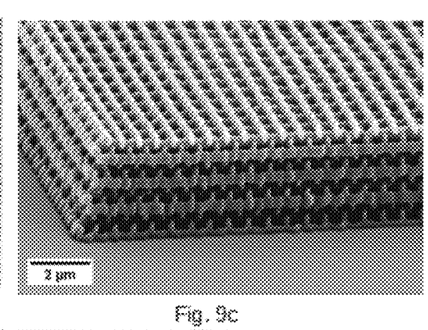
Figure 9D:
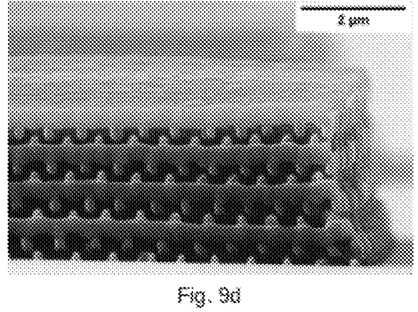

Lastly, to analyze the printing resolution, at an irradiation power close to the polymerization threshold, periodic networks such as a grid (FIGS. 9a and 9b) with lines spaced apart by 250 nm, and three-dimensional structures of photonic crystal type, in "woodpile" form (FIGS. 9c and 9d), having at least one dimension less than 100 nm, were produced. More precisely, FIGS. 9a to 9d show structures obtained by irradiation of the composition 1e, at a speed of 40 μm/s, by an irradiation light source of wavelength $L_{irr}$=532 nm:

FIG. 9a and FIG. 9b: view from above and enlarged view from above of the periodic grid, produced by irradiation of the composition 1e by an irradiation signal with a power of 103 μW, FIG. 9c and FIG. 9d: perspective view and view of an entire structure of photonic crystal type, in cubic "woodpile" form, produced by irradiation of the composition 1e with an irradiation signal with a power of 125 μW.

During these tests, a lateral resolution of the order of 80 nm, an axial resolution (line height) of the order of 190 nm, and a lateral spacing of the order of 250 nm could be obtained.

In summary, the disclosure proposes a family of photoinitiating molecules for a reaction for the two-photon photoinduced generation of radicals, a composition comprising such molecules and a method for three-dimensional printing by irradiation of such photosensitive compositions, which notably provide the following technical and economic benefits:

initiator molecules with a very high sensitivity, notably for wavelengths in the visible domain, initiator molecules that are easier to dissolve in a photosensitive resin, making it possible to obtain highly reactive compositions since they incorporate a significant amount of initiator molecules, the use of an irradiation source in the visible domain, and at an irradiation power level that is substantially lower than in the prior art, a printing quality (resolution) of less than 100 nm and a printing speed that is at least as good as with known initiator molecules.

Figure 10:
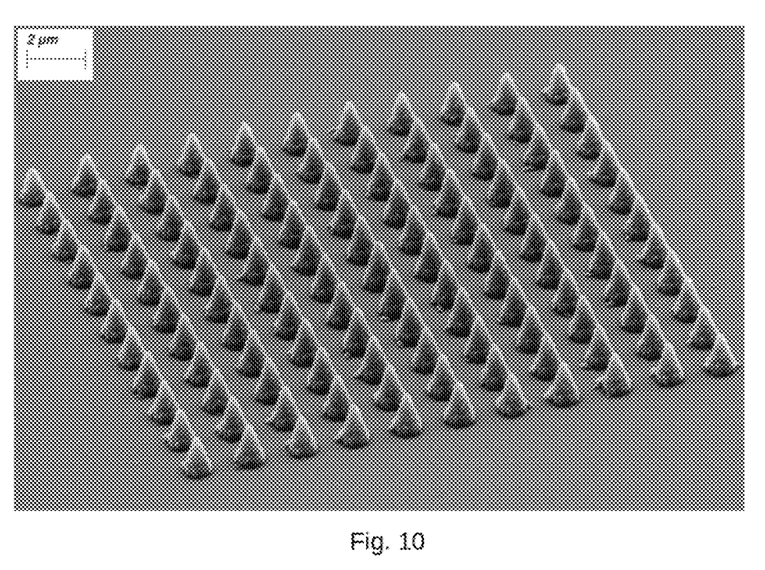
FIG. 10 shows other results of implementing the method according to embodiments of the disclosure.

As specified in the prior art, it is possible to use the resins according to embodiments of the disclosure for parallel writing, that is to say for simultaneously printing a plurality of structures by way of a plurality of laser beams. For this, the initial laser beam of the 3D printer can be separated into a plurality of beams by means of a diffractive optical element (DOE) placed in the optical path. Tests with parallelization of the writing by using an 11×11 diffractive optical element dividing the incident beam into 121 beams of lower power thus made it possible to simultaneously print (cf. FIG. 10) 121 identical structures spaced by 1.85 μm with a DOE separating the laser beam into a grid of 11×11 beams using the formulation of composition 1e (DPPHA/DDA/PA2, proportions by mass: 79.2/19.8/1).

The invention claimed is:

1. A polymerization initiator molecule, capable of being excited by two photons and of generating polymerization-initiating free radicals, the molecule comprising two branches and a halogen atom grafted onto a central phenyl nucleus respectively at positions 1, 3, and 5, each of the branches comprising an oligomer of oligophenyleneethynylenyl type or oligo-2,5-dihalogenphenyleneethynylenyl type.

2. The polymerization initiator molecule of claim 1, wherein each of the branches comprises the oligomer of the oligo-2,5-dihalogenphenyleneethynylenyl type, the dihalogen corresponding to two bromine atoms.

3. The polymerization initiator molecule of claim 1, wherein a free end of each of the branches is terminated by a terminal phenylamine.

4. The polymerization initiator molecule of claim 1, wherein each of the branches is a branch of R=-[p-N,N-(dialkyl)aminophenylethynyl](oligophenyleneethynylenyl) or
R'=-[p-N,N-(dialkyl)aminophenylethynyl](oligo-2,5-dihalophenyleneethynylenyl) type.

5. The polymerization initiator molecule of claim 1, wherein the halogen atom is a bromine atom.

6. A photopolymerizable composition activatable by two-photon absorption, the composition comprising:
a radically polymerizable resin; and
a photochemically effective amount of a radical photoinitiator system,
wherein the radical photoinitiator system comprises at least one polymerization initiator molecule of claim 1.

7. The photopolymerizable composition of claim 6, wherein the radically polymerizable resin comprises a main monomer of vinyl monomer type.

8. The photopolymerizable composition of claim 7, wherein the main monomer is a multifunctional acrylate monomer.

9. The photopolymerizable composition of claim 6, wherein the radically polymerizable resin comprises a solubilizing component comprising one or more of:
a monoacrylate with at least one alkyl chain,
a diacrylate with at least one alkyl chain, and
a dithiol.

10. The photopolymerizable composition of claim 6, wherein the photopolymerizable composition comprises 0.1% to 10% by weight of the radical photoinitiator system.

11. The photopolymerizable composition of claim 9, wherein the photopolymerizable composition comprises:
0.1% to 10% by weight of the radical photoinitiator system; and
C5% to 60% of the solubilizing component.

12. A method for two-photon three-dimensional printing, the method comprising:
transforming a volume of the photopolymerizable composition of claim 6, the transforming comprising irradiating the volume of the photopolymerizable composition with an irradiation source emitting an irradiation signal having a wavelength Lin of between 1 and 1.5 times a cut-off wavelength $L_{CutOff}$ of the at least one initiator molecule, beyond which a molar extinction coefficient of the at least one initiator molecule is less than 1% of a maximum value of the molar extinction coefficient over an absorption band of the at least one initiator molecule.

13. The method of claim 12, wherein the irradiation signal results from a laser with a wavelength of between 508 and 578 nm.

14. The method of claim 12, wherein irradiating the volume of the photopolymerizable composition with the irradiation source comprises direct writing by a laser-type irradiation source, the direct writing being performed at a speed greater than 50 mm/s.

15. The method of claim 12, wherein irradiating the volume of the photopolymerizable composition with the irradiation source comprises parallel projection, of photolithographic type or of holographic projection type, with a number of irradiation sources exceeding ten thousand.

16. A device for three-dimensional-printing, the device comprising means arranged to implement the method of claim 12.

17. The polymerization initiator molecule of claim 3, wherein the terminal phenylamine is of a dialkylphenylamine type.

18. The photopolymerizable composition of claim 7, wherein the main monomer of vinyl monomer type comprises an acrylate monomer or a methacrylate monomer.

\* \* \* \* \*